No. 745,106. Patented November 24, 1903.

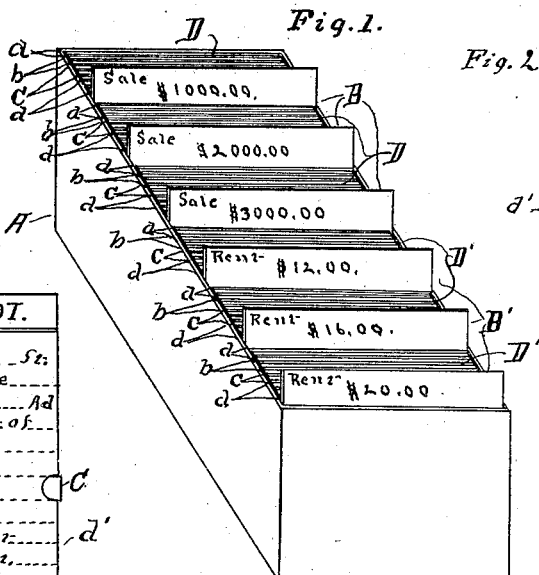

UNITED STATES PATENT OFFICE.

ERWIN B. JEPSON, OF GRAND RAPIDS, MICHIGAN, ASSIGNOR TO THE JEPSON SYSTEMS COMPANY, LIMITED, OF GRAND RAPIDS, MICHIGAN.

FILE AND FILE-CASE.

SPECIFICATION forming part of Letters Patent No. 745,106, dated November 24, 1903.

Application filed February 6, 1903. Serial No. 142,224. (No model.)

*To all whom it may concern:*

Be it known that I, ERWIN B. JEPSON, a citizen of the United States, residing at Grand Rapids, in the county of Kent and State of Michigan, have invented certain new and useful Improvements in Files and File-Cases, of which the following is a specification.

My invention relates to improvements in files for use in real-estate offices; and its objects are, first, to so file the several descriptions of real estate that the several classifications as to sales, rentals, prices, &c., may be readily accessible; second, to so arrange the several files that the desired location of property may be immediately reached, and, third, to so arrange the several descriptions that the contract between the property owner and the real-estate agent, while printed upon the card containing the description of the property, is not accessible to the third party interested. I attain these objects by the arrangement of parts shown in the accompanying drawings, in which—

Figure 1 is a perspective of a filing-case, showing the distribution of the several classifications and descriptions of property. Fig. 2 shows the entire descriptive portion of the filing-slip. Fig. 3 shows the same folded and sealed to protect the contract between the property owner and the agent; and Fig. 4 is a plan of the reverse side of the filing-slip, showing a portion of a contract between the property owner and the agent.

Similar letters refer to similar parts throughout the several views.

In the accompanying drawings, A is the filing-case, which is an oblong box properly divided to secure the several descriptions and classifications of property.

B represents division-slips showing the selling-price and B' the rental-price classifications of the file, and D and D' are the filing-slips containing upon one side the description of the property and the contract between the property owner and the agent, as indicated in Fig. 4. After a contract has been completed and the blank form (shown in Fig. 4) has been filled out the slip is folded up on the line $xx$, so that the contract will be inside of the folds, and the descriptive portion $d'$ will form the front and $d''$ the back of the slip when the two folds are sealed together substantially as shown at C in Fig. 3, so that while the descriptive portion, terms, &c., shown at $d'$ and $d''$ are perfectly accessible the contract portion is practically inaccessible to third parties or prospective purchasers, tenants, &c.

For the purpose of readily determining the location of a certain line of property I print the descriptions and contracts for each classification upon cards of four different colors. Thus in Fig. 1 in each classification $a$ represents, we will say, white cards, upon which is listed property in the north portion of the city; $b$ represents yellow cards, indicating that the property listed is in the south portion; $c$ indicates blue cards, referring to the east portion of the city, and $d$ indicates red cards, indicating that the property thereon listed is in the west portion of the city.

To illustrate, a party desires a two-thousand-dollar purchase or a sixteen-dollar rental in the north portion of a city. It is simply necessary to examine the white cards in the classification desired, &c., through the entire list.

The clamps C are of metal and may with sufficient effort be removed to disclose the contract.

Having thus fully described my invention, what I claim as new, and desire to secure by Letters Patent of the United States, is—

In a file for listing real estate, a file-case divided and classified as to price, file-slips having description and price of property on one side and the contract and terms upon the other side said slips folded and sealed to conceal said contract, and classified by colors indicating location, substantially as and for the purpose set forth.

Signed at Grand Rapids, Michigan, January 30, 1903.

ERWIN B. JEPSON.

In presence of—
EDWARD L. GOUGH,
ITHIEL J. CILLEY.